United States Patent [19]

Berneth et al.

[11] Patent Number: 5,013,857
[45] Date of Patent: May 7, 1991

[54] PROCESS FOR THE PREPARATION OF SULPHO-FREE TRIPHENYL-METHANE DYESTUFFS

[75] Inventors: Horst Berneth; Roderich Raue, both of Leverkusen, Fed. Rep. of Germany

[73] Assignee: Bayer Aktiengesellschaft, Leverkusen, Fed. Rep. of Germany

[21] Appl. No.: 449,035

[22] Filed: Dec. 11, 1989

[30] Foreign Application Priority Data

Dec. 14, 1988 [DE] Fed. Rep. of Germany ....... 3842014

[51] Int. Cl.$^5$ ...................... C09B 11/10; C07C 50/04
[52] U.S. Cl. .................................. 552/110; 552/114; 552/302; 552/304; 552/113
[58] Field of Search ............... 552/113, 302, 304, 114, 552/110

[56] References Cited

U.S. PATENT DOCUMENTS

| | | | |
|---|---|---|---|
| 1,470,555 | 10/1923 | Craver | 552/113 |
| 4,495,104 | 1/1985 | Imada et al. | 552/307 |
| 4,559,177 | 12/1985 | Okutani et al. | 552/307 |
| 4,874,752 | 10/1989 | Terao et al. | 552/307 |

FOREIGN PATENT DOCUMENTS

| | | | |
|---|---|---|---|
| 629823 | 4/1963 | Belgium | 552/113 |
| 2736679 | 3/1979 | Fed. Rep. of Germany. | |
| 2853822 | 7/1980 | Fed. Rep. of Germany. | |

OTHER PUBLICATIONS

O. Fischer, Ber. Dtsch. Chem. Ges. 10, 1 624 (1877), 11, 950 (1878), 14, 2 520 (1881).
O. Fischer, Ann. d. Chem. 206, 129 (1881).

Primary Examiner—Frederick E. Waddell
Assistant Examiner—Raymond Covington
Attorney, Agent, or Firm—Sprung Horn Kramer & Woods

[57] ABSTRACT

Process for the preparation of sulpho-free triphenylmethane dyestuffs of the formula

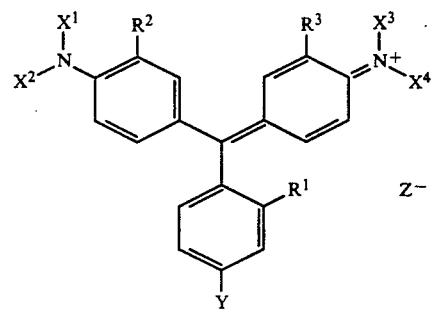

in which
$R^1$–$R^3$ denote hydrogen, $C_1$–$C_6$-alkyl, preferably methyl, or halogen, preferably chlorine,
Y denotes hydrogen or $NX^5X^6$,
$X^1$–$X^6$ denote hydrogen, $C_1$–$C_6$-alkyl, preferably methyl, ethyl, benzyl or phenyl and
$Z^-$ denotes an anion by oxidation of their leuco products with manganese dioxide, characterized in that, after the oxidation is completed, manganese hydroxide or manganese carbonate and the carbinol base of the dyestuff are formed by the addition of hydroxide or carbonate, during or after which the carbinol base is taken up in a water-immiscible solvent, separated off from the manganese hydroxide or manganese carbonate and from the water phase, the solution is mixed with the acid HZ which may have been mixed with water, the solvent is either distilled off before the mixing or separated or distilled off after the mixing, and the dyestuff is isolated as a solution or in solid form after evaporation or crystallization.

8 Claims, No Drawings

PROCESS FOR THE PREPARATION OF SULPHO-FREE TRIPHENYL-METHANE DYESTUFFS

Several procedures are known for the preparation of sulpho-free triphenylmethane dyestuffs by oxidation of their leuco products. The oxidation using lead dioxide in hydrochloric acid solution (O. Fischer, Ber. Dtsch. Chem. Ges. 10, 1 624 (1877), 11, 950 (1878), 14, 2 520 (1881)) and the air oxidation by means of catalysts in solvents such as glacial acetic acid (German Offenlegungsschriften 2,736,679, 2,853,822) are utilized or utilizable in industry.

Manganese dioxide has also been used as oxidizing agent (O. Fischer, Ann. d. Chem. 206, 129 (1881)).

In contrast to acid triphenylmethane dyestuffs, where the manganese can be precipitated in the alkaline pH range (e.g. as ammonium manganese phosphate, EP 0,120,399) and the dyestuff remains in solution, in the case of sulpho-free triphenylmethane dyestuffs manganese is difficult to separate off. On the one hand, the dyestuffs can often be precipitated in acid medium incompletely or not at all, on the other there are hardly any sparingly soluble salts of manganese in acid medium, with the exception of, for example, oxalate and pyrophosphate, which, however, do not allow quantitative removal of the manganese either.

There was therefore a demand for a process which combined the ecologically safe oxidation using manganese dioxide, the complete removal of manganese, and the isolation of sulpho-free triphenylmethane dyestuffs as industrially interesting salts or concentrated solutions.

The invention relates to a process for the preparation of sulpho-free triphenylmethane dyestuffs of the formula

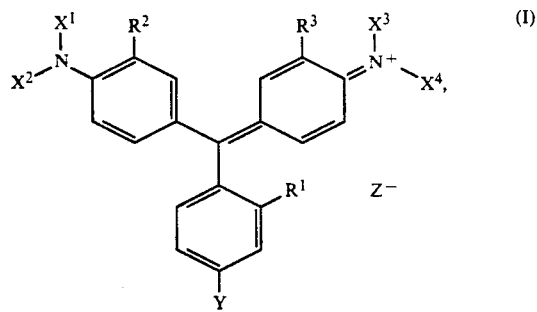

in which $R^1-R^3$ denote hydrogen, $C_1-C_6$-alkyl, preferably methyl, or halogen, preferably chlorine, Y denotes hydrogen or $NX^5X^6$, $X^1-X^6$ denote hydrogen, $C_1-C_6$-alkyl, preferably methyl, ethyl, benzyl or phenyl and $Z^-$ denotes an anion by oxidation of their leuco products with manganese dioxide, characterized in that, after the oxidation is completed, manganese hydroxide or manganese carbonate and the carbinol base of the dyestuff are formed by the addition of hydroxide or carbonate, during or after which the carbinol base is taken up in a water-immiscible solvent, separated off from the manganese hydroxide or manganese carbonate and from the water phase, the solution is mixed with the acid HZ (II) which may have been mixed with water, the solvent is either distilled off before the mixing or separated or distilled off after the mixing, and the dyestuff is isolated as a solution or in solid form after evaporation or crystallization.

Suitable acids HZ (II) are all inorganic and organic acids or mixtures thereof which allow a highly crystalline dyestuff salt or a stable concentrated dyestuff solution to be obtained.

Suitable solvents are saturated, branched or unbranched and/or halogen-substituted alkanes, cycloalkanes, dialkyl ethers, unsubstituted or alkyl-, alkoxy- or halogen-substituted benzene, naphthalene or biphenyl, which may also be partially hydrogenated, or esters.

The leuco products are known or can be prepared by known processes.

The oxidation using manganese dioxide is carried out in acid medium, preferably in hydrochloric acid, to which carboxylic acids, such as, for example, acetic acid, may have been added. The oxidation temperatures are preferably in the range 0°–50° C., particularly preferably 0°–30° C.

The solution is made alkaline by the addition of hydroxides or carbonates, preferably of the alkali metal or alkaline earth metals. Filtering aids can also be added. Manganese hydroxide or manganese carbonate and the carbinol base of the dyestuff precipitates. The carbinol base is dissolved in the water-immiscible solvent, it being possible for the solvent to be added before or after the addition of the hydroxide or carbonate. This procedure takes place at 10°–100° C., in which it may be advantageous for complete conversion to the carbinol base to stir for some time, e.g. at 40°–70° C. To separate off the manganese hydroxide or manganese carbonate and the water phase, the mixture can be filtered and then the water phase separated off from the solvent phase or, alternatively, in the case of an organic phase of lower specific gravity, after the mixture is allowed to settle, the suspension of manganese hydroxide or manganese carbonate in the water phase can be separated off or, alternatively, both processes can be combined. These separations can be carried out at 10°–100° C., preferably 20°–70° C.

The solvent phase which contains the carbinol base can then be mixed with the acid HZ (II) or an aqueous solution thereof. This leads to the formation of the dyestuff of formula (I). To produce concentrated solutions, the dyestuff phase is then separated off from the solvent phase and is subjected to incipient distillation preferably under a vacuum to remove any remaining organic solvent. The phase separation takes place at 10°–100° C., preferably at 20°–60° C. To obtain the solid dyestuff, it is also possible to separate off the solvent phase and evaporate the dyestuff phase to dryness or, alternatively, the mixture of solvent phase and dyestuff phase can be evaporated together to dryness. This is advantageously carried out under a vacuum.

However, it is also possible to evaporate the solvent phase which contains the carbinol base, preferably under a vacuum. The carbinol base obtained as a residue can then be reacted with acid HZ (II) and water to give a concentrated dyestuff solution, but it is also possible to convert it into the solid dyestuff by addition of acid HZ (II) and, if necessary, water and evaporation to dryness, preferably under a vacuum.

Furthermore, an aqueous solution of the dyestuff of formula (I) saturated while hot, from which the crystalline dyestuff of the formula (I) precipitates upon cooling, can be prepared using suitable acids HZ (II). Usually it is immaterial whether this is done by starting with the carbinol base obtained by evaporation or with the solvent phase which contains the carbinol base and, in the latter case, separating off the solvent phase before cooling.

The process according to the invention is preferred for the preparation of sulpho-free triphenylmethane dyestuffs of the formula

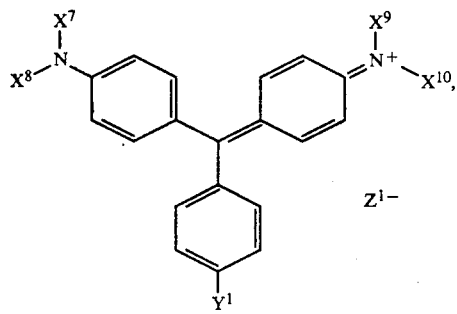

in which $Y^1$ is hydrogen or $NX^{11}X^{12}$, $X^7$-$X^{12}$ are hydrogen, methyl, ethyl, benzyl or phenyl and $Z^{1-}$ is an anion.

The compounds of the formula (III) are also understood to mean dyestuff mixtures, such as, for example, the mixture of the compounds (IV) to (VI):

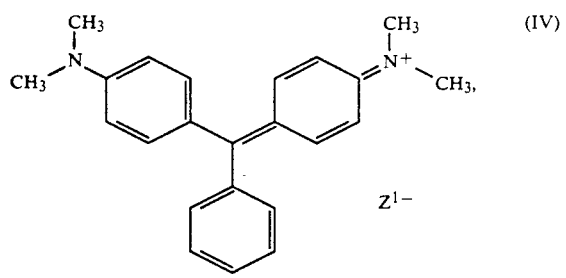

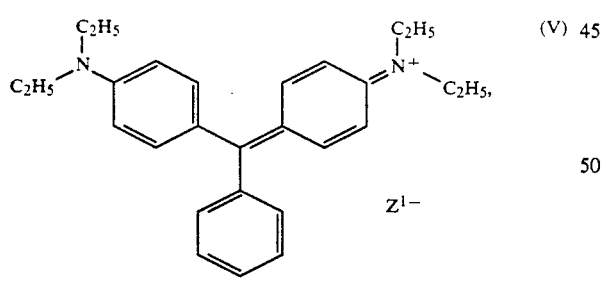

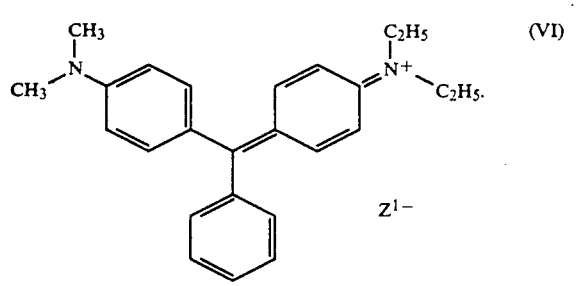

A process for the preparation of sulpho-free triphenylmethane dyestuffs of the formula

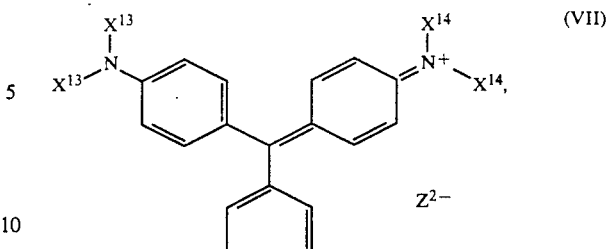

in which $X^{13}$ and $X^{14}$ denote methyl or ethyl and $Z^{2-}$ denotes an anion of hydrochloric acid, sulfuric acid, phosphoric acid, methanesulphonic acid, methanephosphonic acid, formic acid, acetic acid, propionic acid, glycolic acid, lactic acid, oxalic acid, malonic acid, succinic acid, malic acid, tartaric acid, maleic acid, fumaric acid, diglycolic acid or citric acid, and the solvent used is benzene which is unsubstituted or substituted by methyl, ethyl, propyl, 2-propyl, butyl, methoxy, ethoxy, propoxy, 2-propoxy, butoxy, fluorine, chlorine or bromine is particularly preferred.

Examples of these solvents are toluene, xylene, ethylbenzene, cumene, 1,2,3-, 1,2,4- or 1,3,5-trimethylbenzene, 4-isopropyltoluene, diethylbenzene, diisopropylbenzene, anisole, phenetole, methylanisole, chlorobenzene, 1,2-dichlorobenzene, chlorotoluene, chloroxylene or mixtures thereof.

A process for the preparation of the compounds of the formula (VII) in which $Z^{-}$ denotes an anion of hydrochloric acid, sulfuric acid, phosphoric acid, acetic acid or oxalic acid, the manganese is precipitated as carbonate and is separated off and the solvents used are toluene, xylene, chlorobenzene or 1,2-dichlorobenzene is very particularly preferred.

The process according to the invention is particularly suitable for the preparation of malachite green salts in solid or dissolved form (a) of formula

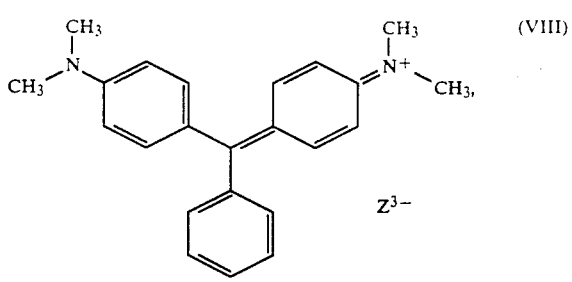

in which $Z^{3-}$ denotes $HSO_4$, $\frac{1}{2} SO_4^{2-}$, $H_2PO_4$, HOOC—COO$^-$ × $\frac{1}{2}$ HOOC—COOH by oxidation of its leuco product with manganese dioxide, characterized in that, after the oxidation is completed, manganese carbonate and the carbinol base of the dyestuff are formed by means of sodium carbonate or potassium carbonate, taken up in toluene, separated off from the manganese carbonate and from the water phase, either an aqueous solution of the acid $HZ^3$ is added, mixed and the toluene phase is separated off, or the toluene is distilled off and the residue is taken up in an aqueous solution of the acid $HZ^3$ and the mixture is in each case evaporated to dryness, (b) of the formula

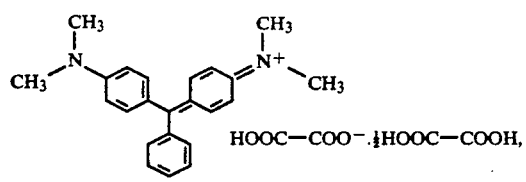

by oxidation of its leuco product with manganese dioxide, characterized in that, after the oxidation is completed, manganese carbonate and the carbinol base of the dyestuff are formed by means of sodium carbonate or potassium carbonate, taken up in toluene, separated off from manganese carbonate and from the water phase, a not too dilute aqueous solution of oxalic acid is added and mixed, the toluene phase is separated off in the heat and the dyestuff is allowed to crystallize from the aqueous phase by cooling and is isolated, (c) of the formula

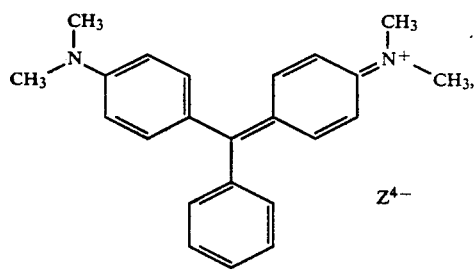

in which $Z^{4-}$ denotes $Cl^-$, $HSO_4^-$, $\frac{1}{2} SO_4^{2-}$, $CH_3COO^-$ or mixtures thereof by oxidation of its leuco product with manganese dioxide, characterized in that, after the oxidation is completed, manganese carbonate and the carbinol base of the dyestuff are formed by means of sodium carbonate or potassium carbonate, taken up in toluene, separated off from manganese carbonate and from the water phase, an aqueous solution of the acid $HZ^4$ is added and mixed, and the toluene phase is separated off.

EXAMPLE 1

90.3 g of leuco malachite green are dissolved in a mixture of 86.5 g of concentrated hydrochloric acid and 100 ml of water, and this solution is diluted with 500 ml of water.

After cooling to 0° C., 91.5 g of a 34% strength aqueous manganese dioxide suspension are added. The temperature increases to 15° C. during the oxidation. After 15 minutes, 140 g of potassium carbonate and 100 ml of toluene are added. The mixture is heated to 55°-60° C., filtered off with suction through a glass sintered crucible, and the product is washed with 40 ml of toluene. The water phase is separated off, and the toluene phase is concentrated to a large extent in a rotary evaporator at 20 mbar and 45° C. A solution of 33.5 g of anhydrous oxalic acid in 150 ml of water is added and mixed at 45° C. for 30 minutes. The remaining toluene and the water are then distilled off at 20 mbar and 45° C., until the weight remains constant. 121.5 g of about 91% pure malachite green oxalate (87% of theory) can be removed from the flask of the rotary evaporator in the form of green crystals. Melting point: 137°-139° C. Mn content: 1 mg/kg.

EXAMPLE 2

776.8 g of leuco malachite green solution are prepared and oxidized as in Example 1. 15 minutes after the addition of manganese dioxide, 107.5 g of anhydrous sodium carbonate and 100 ml of technical grade xylene mixture are added. The mixture is heated to 55°-60° C., filtered off with suction through a glass sintered crucible, and the product is washed with 40 ml of xylene. The water phase is separated off. The xylene phase is mixed with a mixture of 125 ml of water and 25 g of concentrated sulfuric acid at 40° C. for 2 hours and evaporated in a laboratory paddle dryer to dryness at 20 mbar and 45° C. This gives 116.8 g of about 90% pure malachite green hydrogen sulfate (90% of theory) in the form of green crystals of melting point 140°-145° C. Mn content: 1 mg/kg.

EXAMPLE 3

If 51.3 g of citric acid monohydrate is used, 155.4 g of about 82% pure malachite green citrate (89% of theory) are obtained analogously in the form of bluegreen crystals of melting point 100°-105° C.

EXAMPLE 4

If 28.2 g of 85% strength phosphoric acid are used, 112 g of about 93% pure malachite green dihydrogen phosphate (89% of theory) are obtained analogously in the form of a blue-green powder of melting point 155° C.

EXAMPLE 5

If analogously to Example 2 792.1 g of a leuco diamond green solution which was prepared from 105.6 g of leuco diamond green is used and the procedure of Example 2 is repeated, 126.3 g of about 92% pure diamond green hydrogen sulfate (88% of theory) are obtained in the form of green crystals of melting point 75°-80° C. Mn content: 1 mg/kg.

EXAMPLE 6

776.8 g of leuco malachite green solution are prepared as in Example 1 and oxidized.

15 minutes after the addition of manganese dioxide, 100 ml of 30% strength sodium hydroxide solution and 100 ml of 1,2-dichlorobenzene are added. The mixture is heated to 55°-60° C. The manganese hydroxide is allowed to settle, the mixture is filtered off with suction through a glass sintered crucible, and the product is washed with 40 ml of 1,2-dichlorobenzene. The organic phase is separated from the water and stirred at 45° C. with 238 ml of water and 37.1 g of anhydrous oxalic acid for 2 hours. Finally the phases are separated, the aqueous dyestuff phase is stirred while cold, filtered off with suction, and the product is dried at 50° C. in vacuo. This gives 89.6 g of about 100% pure malachite green oxalate (71% of theory) in the form of fine green crystals of melting point 160° C. Mn content: <1 mg/kg.

If the experiment is repeated and the 1,2-dichlorobenzene phase and the aqueous dyestuff mother liquor are used again, the yield increases to 85-88% of theory.

EXAMPLE 7

776.8 g of leuco malachite green solution are prepared as in Example 1 and oxidized. 15 minutes after the addition of manganese dioxide, 107.5 g of anhydrous sodium carbonate and 100 ml of toluene are added. The mixture is heated to 55°-60° C., allowed to settle, filtered off with suction through a glass sintered crucible, and the product is washed with 40 ml of toluene. The water phase is separated off. The toluene phase is stirred with a mixture of 50 ml of water and 17.3 g of concentrated sulfuric acid for 1 h. The mixture is then allowed to settle, and the product is separated off. The dyestuff solution is subjected to incipient distillation in vacuo for a short time to remove any remaining toluene and is then brought to a total weight of 224 g by means of water. This gives a stable green solution of a mixture of malachite green hydrogen sulfate and malachite green sulfate, which is 36%, relative to the dyestuff cation. Yield: 89.4%. Mn content: 1 mg/kg.

The examples below can be prepared analogously:

is taken up in a water-immiscible solvent, separated off from the manganese hydroxide or manganese carbonate and from the water phase, the solution is mixed with the acid HZ which may have been mixed with water, the solvent is either distilled off before the mixing or separated or distilled off after the mixing, and the dyestuff is isolated as a solution or in solid form after evaporation or crystallization 2. Process according to claim 1 for the preparation of a sulpho-free triphenylmethane dyestuff of the formula

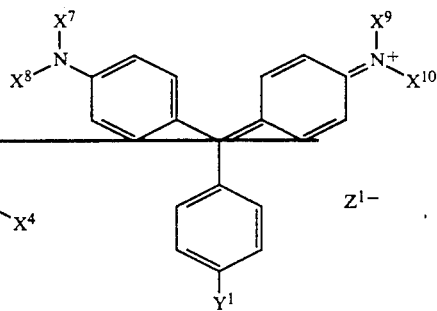

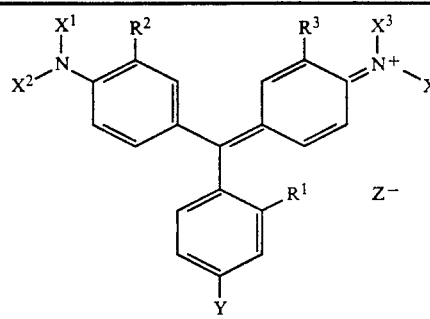

| Example | $X^1$ | $X^2$ | $X^3$ | $X^4$ | Y | $R^1$ | $R^2$ | $R^3$ | Z | Yield |
|---|---|---|---|---|---|---|---|---|---|---|
| 8 | $CH_3$ | $CH_3$ | $CH_3$ | $CH_3$ | $N(CH_3)_2$ | H | H | H | Cl | 85% |
| 9 | $C_2H_5$, $CH_2$-phenyl | | $C_2H_5$, $CH_2$-phenyl | | H | H | H | H | $HSO_4$ | 80% |
| 10 | $CH_3$ | $CH_3$ | $CH_3$ | $CH_3$ | H | Cl | H | H | HOOC—COO | 83% |
| 11 | $C_2H_5$ | H | $C_2H_5$ | H | H | Cl | $CH_3$ | $CH_3$ | HOOC—COO | 79% |

We claim:

1. A process for the preparation of a sulpho-free triphenylmethane dyestuff of the formula

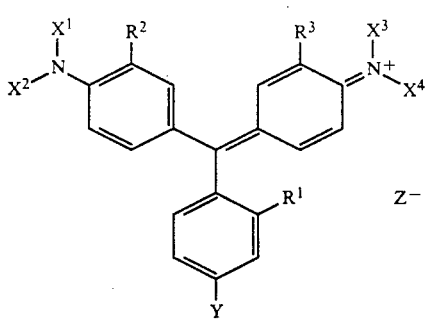

in which
$R^1$-$R^3$ denote hydrogen, $C_1$-$C_6$-alkyl, or halogen,
Y denotes hydrogen or $NX^5X^6$,
$X^1$-$X^6$ denote hydrogen, $C_1$-$C_6$-alkyl, benzyl or phenyl and
$Z^-$ denotes an anion by oxidation of their leuco products with manganese dioxide, wherein after the oxidation is complete manganese hydroxide or manganese carbonate and the carbinol base of the dyestuff are formed by the addition of hydroxide or carbonate, during or after which the carbinol base in which
$Y^1$ denotes hydrogen or $NX^{11}X^{12}$,
$X^7$-$X^{12}$ denote hydrogen, methyl, ethyl, benzyl or phenyl and
$Z^{1-}$ denotes an anion.

3. Process according to claim 1 for the preparation of a sulpho-free triphenylmethane dyestuff of the formula

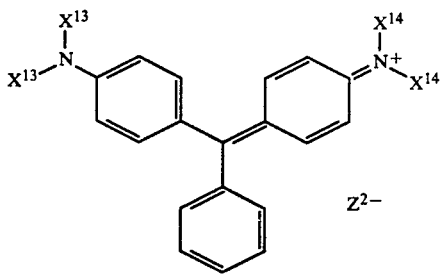

in which

X¹—and X¹⁴ denote methyl or ethyl and

Z²⁻ denotes an anion of hydrochloric acid, sulfuric acid, phosphoric acid, methanesulphonic acid, methanephosphonic acid, formic acid, acetic acid, propionic acid, glycolic acid, lactic acid, oxalic acid, malonic acid, succinic acid, malic acid, tartaric acid, maleic acid, fumaric acid, diglycolic acid or citric acid, and the solvent used is benzene which is unsubstituted or substituted by methyl, ethyl, propyl, 2-propyl, butyl, methoxy, ethoxy, propoxy, 2-propoxy, butoxy, fluorine, chlorine or bromine.

4. A process of claim 1 for the preparation of the dyestuff of the formula

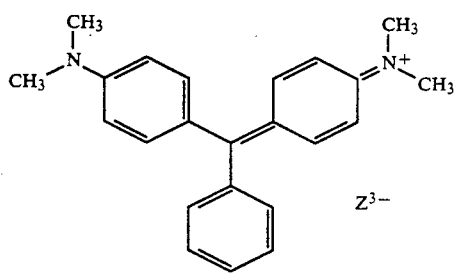

in which

Z³⁻ denotes $HSO_4^-$, ½ $SO_4^{2-}$, $H_2PO_4^-$, HOOC—COO⁻×½ HOOC—COOH by oxidation of its leuco product with manganese dioxide, wherein, after the oxidation is completed, manganese carbonate and the carbinol base of the dyestuff are formed by the addition means of sodium carbonate or potassium carbonate, the carbinol base is taken up in toluene, separated off from the manganese carbonate and from the water phase, either an aqueous solution of the acid $HZ^3$ is added, mixed and the toluene phase is separated off, or the toluene is distilled off and the residue is taken up in an aqueous solution of the acid $HZ^3$ and the mixture is in each case evaporated to dryness.

5. A process of claim 1 for the preparation of the dye of the formula

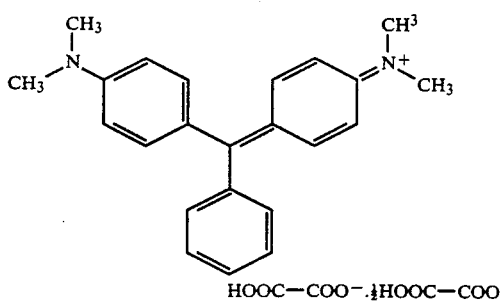

by oxidation of its leuco product with manganese dioxide, where, after the oxidation is completed, manganese carbonate and the carbinol base of the dyestuff are formed by the addition of sodium carbonate or potassium carbonate, the carbinol base is taken up in toluene, separated off from manganese carbonate and from the water phase, a not too dilute aqueous solution of oxalic acid is added and mixed, the toluene phase is separated off in the heat and the dyestuff is allowed to crystallize from the aqueous phase by cooling and is isolated.

6. A process of claim 1 for the preparation of a solution of the dyestuff of the formula

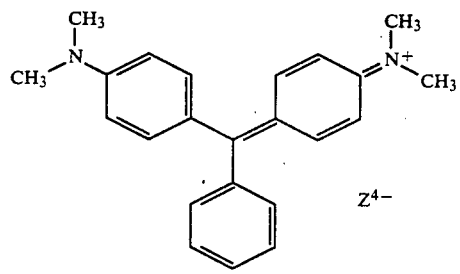

in which

Z⁴⁻ denotes Cl⁻, $HSO_4^-$, ½ $SO_4^{2-}$, $CH_3COO^-$ or mixtures by oxidation of its leuco product with manganese dioxide, wherein, after the oxidation is completed, manganese carbonate and the carbinol base of the dyestuff are formed by the addition of sodium carbonate or potassium carbonate, the carbinol base is taken up in toluene, separated off from manganese carbonate and from the water phase, an aqueous solution of the acid $HZ^4$ is added and mixed, and the toluene phase is separated off.

7. The process according to claim 1 wherein $R^1$-$R^3$ denote hydrogen, methyl or halogen.

8. The process according to claim 1 wherein $X^1$-$X^6$ denote hydrogen, methyl, ethyl, benzyl, or phenyl.

* * * * *

UNITED STATES PATENT AND TRADEMARK OFFICE
CERTIFICATE OF CORRECTION

PATENT NO. : 5,013,857

DATED : May 7, 1991

INVENTOR(S) : Berneth et al.

It is certified that error appears in the above-identified patent and that said Letters Patent is hereby corrected as shown below:

Col. 5, line 37    Delete " $SOl_4^{2-}$ " and substitute -- $SO_4^{2-}$ --

Col. 8, line 15    Delete " 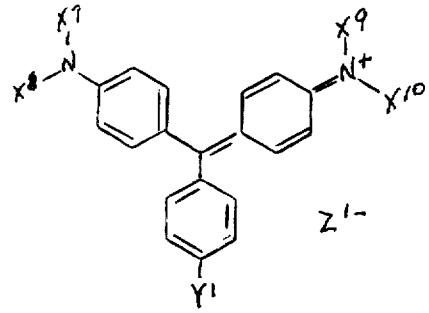 "

Col. 8, line 50    Insert -- 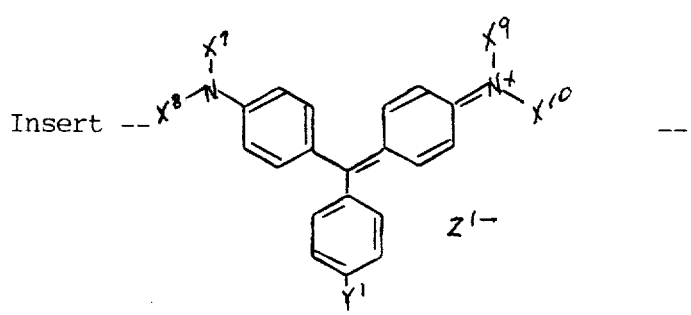 --

UNITED STATES PATENT AND TRADEMARK OFFICE
CERTIFICATE OF CORRECTION

PATENT NO.   : 5,013,857
DATED        : May 7, 1991
INVENTOR(S)  : Berneth et al It is certified that error appears in the above-identified patent and that said Letters Patent is hereby corrected as shown below:

Col. 9, line 15   Delete " $X^-$ " and substitute -- $X^{13}$ --

Col. 10, line 17  Delete " where " and substitute -- wherein --

Col. 10, line 43  After " mixtures " insert -- thereof --

Signed and Sealed this

Sixth Day of April, 1993

Attest:

STEPHEN G. KUNIN

Attesting Officer

Acting Commissioner of Patents and Trademarks